(12) United States Patent
French (10) Patent No.: US 10,763,767 B2
(45) Date of Patent: Sep. 1, 2020

(54) DIRECT SHAFT POWER GENERATION AND MONITORING SYSTEM

(71) Applicant: Joseph A. French, Cedar Park, TX (US)

(72) Inventor: Joseph A. French, Cedar Park, TX (US)

(*) Notice: Subject to any disclaimer, the term of this patent is extended or adjusted under 35 U.S.C. 154(b) by 0 days.

(21) Appl. No.: 16/541,139

(22) Filed: Aug. 14, 2019

(65) Prior Publication Data

US 2020/0059177 A1  Feb. 20, 2020

Related U.S. Application Data

(60) Provisional application No. 62/718,762, filed on Aug. 14, 2018.

(51) Int. Cl.
| | |
|---|---|
| *H02P 9/06* | (2006.01) |
| *B62B 9/00* | (2006.01) |
| *B62B 7/04* | (2006.01) |
| *H02K 47/04* | (2006.01) |
| *H02K 7/10* | (2006.01) |
| *H02K 13/00* | (2006.01) |
| *H02P 6/12* | (2006.01) |

(52) U.S. Cl.
CPC ............... *H02P 9/06* (2013.01); *B62B 7/04* (2013.01); *B62B 9/00* (2013.01); *H02K 7/10* (2013.01); *H02K 13/00* (2013.01); *H02K 47/04* (2013.01); *H02P 6/12* (2013.01)

(58) Field of Classification Search
CPC ............... H02P 9/06; B62B 7/04; B62B 9/00
USPC ................................................ 290/1 R, 1 C
See application file for complete search history.

(56) References Cited

U.S. PATENT DOCUMENTS

| | | | | |
|---|---|---|---|---|
| 4,048,511 | A * | 9/1977 | Watanabe | B60K 25/08 290/1 R |
| 6,987,327 | B1 * | 1/2006 | Lucatero | B62J 6/08 290/1 A |
| 7,145,256 | B2 * | 12/2006 | Koharcheck | B62J 6/01 290/1 R |
| 7,560,822 | B1 * | 7/2009 | Hoffmann | A63B 21/0053 290/1 R |
| 8,193,650 | B2 * | 6/2012 | Thorne | B62B 7/002 290/1 R |
| 8,356,824 | B1 * | 1/2013 | Manweiler | B62B 9/005 280/33.992 |
| 9,956,979 | B1 * | 5/2018 | Fernsten | B62B 9/26 |

(Continued)

*Primary Examiner* — Viet P Nguyen
(74) *Attorney, Agent, or Firm* — Law Office of Jeff Williams PLLC; J. Oliver Williams (57) ABSTRACT

A portable power generation system includes a power generation unit and a monitoring unit. The power generation unit is detachable from the wheeled occupant apparatus and includes a pivoting arm, a rotating gear, and a control unit. The rotating gear is in communication with the wheeled occupant apparatus and is configured to rotate upon movement of the wheeled occupant apparatus, such that rotation of the rotating gear induces an electrical power generation effect. The control unit is in communication with the rotating gear through the pivoting arm and regulates the storage and transmission of electrical power. The monitoring unit is in electrical communication with the power generation unit and dispenses electrical power and provides user data to a user.

15 Claims, 7 Drawing Sheets

(56) References Cited

U.S. PATENT DOCUMENTS

| | | | |
|---|---|---|---|
| 2007/0013244 A1* | 1/2007 | Kinkaid | F03G 7/08 |
| | | | 310/75 C |
| 2007/0284881 A1* | 12/2007 | McLaughlin | A63B 21/0053 |
| | | | 290/1 R |
| 2008/0084040 A1* | 4/2008 | McGowan | B62B 9/00 |
| | | | 280/47.38 |
| 2010/0148582 A1* | 6/2010 | Carter | H02J 7/345 |
| | | | 307/48 |
| 2013/0228989 A1* | 9/2013 | Horst | B62B 7/04 |
| | | | 280/47.38 |
| 2015/0014991 A1* | 1/2015 | Al Jaeedi | B60L 53/00 |
| | | | 290/7 |

* cited by examiner

DIRECT SHAFT POWER GENERATION AND MONITORING SYSTEM

CLAIM OF PRIORITY

This application claims the benefit of U.S. Provisional Application No. 62/718,762, filed 14 Aug. 2018. The information contained therein is hereby incorporated by reference.

BACKGROUND

1. Field of the Invention

The present application relates to a portable power generation device, and more particularly to a portable device that generates electrical power from engagement with a rotating wheel of a wheeled occupant apparatus so as to feed electrical energy to one or more devices.

2. Description of Related Art

Current wheeled occupant apparatuses are used to transport people between locations. These can be seen with devices having one or more wheels, such as bikes, all types of cycles, strollers, and so forth. With the advent of personal and wearable technology in the past decade or more, there is a greater need to have access to electrical energy to assist people staying connected via personal electronic devices. Some wheeled occupant apparatuses have a type of power generation system, however, these systems are full of limitations and ultimately hinder functionality, design implementations and capabilities. For example, these systems are often bulky and space consuming on the apparatus. Typically, where power is generated, it tends to only be for storage within the particular system and not suited for subsequent use on a remote device. Furthermore, the power generation of current systems are limited to yielding power from a gear reduction system operationally coupled between the wheel and motor such that rotation of wheels cause the motor to generate electricity.

As noted above, these conventional systems take up much needed space for design and application, as well, the gear reduction systems are not prone to have the ability to yield very much torque without the stripping of gears. Furthermore, the current gear systems in use are noisy. Further still, there are functions that may be provided by a portable motion type of generator system that that helps to ensure safety and proper use of the overall system and external devices. Although great strides have been made in the area of power generation with respect to wheeled occupant apparatuses, considerable shortcomings remain.

SUMMARY OF THE INVENTION

It is an object of the present application to provide a portable power generation system configured to operate with one or more wheeled occupant apparatuses. These apparatuses may include those devices and vehicles that are operable by a single person and not used for mass transportation. Examples may include a lawn mower, a stroller, a golf cart, an all-terrain vehicle, a bicycle, and a piece of workout equipment. The power generation system is configured to harness movement from the occupant apparatus and convert that energy into the generation of electrical energy that may be used for storage purposes and selective distribution and for the operation of one or more internal systems.

The power generation system is configured to generate power from a wheel of the apparatus. A pivoting arm is used to selectively locate a rotating gear in communication with the wheel. Electrical power is either stored and/or transmitted to a monitoring unit for use and/or storage. The electrical power can be used to display user data to a user regarding any of environmental conditions, and/or system performance, and/or user vitals. The system may be used to communicate to an external electronic device for charging. Communication may also be for the purpose of displaying the user data via the external electronic device.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The system and method of use in accordance with the present application overcomes one or more of the above-discussed problems commonly associated with conventional power generation system. Specifically, the system of the present application is configured to couple to any wheeled occupant apparatus so as to engage any movable or rotatable surface/object to induce a power generative effect. The system can be configured in multiple ways to permit integrated operation with axles or wheels, for instance, or may be detachable and interchangeable with various types of wheeled occupant apparatuses. The system is capable of monitoring performance characteristics of the wheeled occupant apparatus. Furthermore, the system is configured to include external ports to communicate with one or more electronic devices for the distribution of electrical energy and for mere communication with the internal system. These and other unique features of the system are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The embodiments and method of the present application is illustrated in the associated drawings. The portable power generation system includes a power generation unit and a monitoring unit. The power generation unit is detachable from the wheeled occupant apparatus and includes a pivoting arm, a rotating gear, and a control unit. The rotating gear is in communication with the wheeled occupant apparatus and is configured to rotate upon movement of the wheeled occupant apparatus, such that rotation of the rotating gear induces an electrical power generation effect. The control unit is in communication with the rotating gear through the pivoting arm and regulates the storage and transmission of electrical power. The monitoring unit is in electrical communication with the power generation unit and dispenses electrical power and provides user data to a user. Additional features and functions are illustrated and discussed below.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Figure 1:
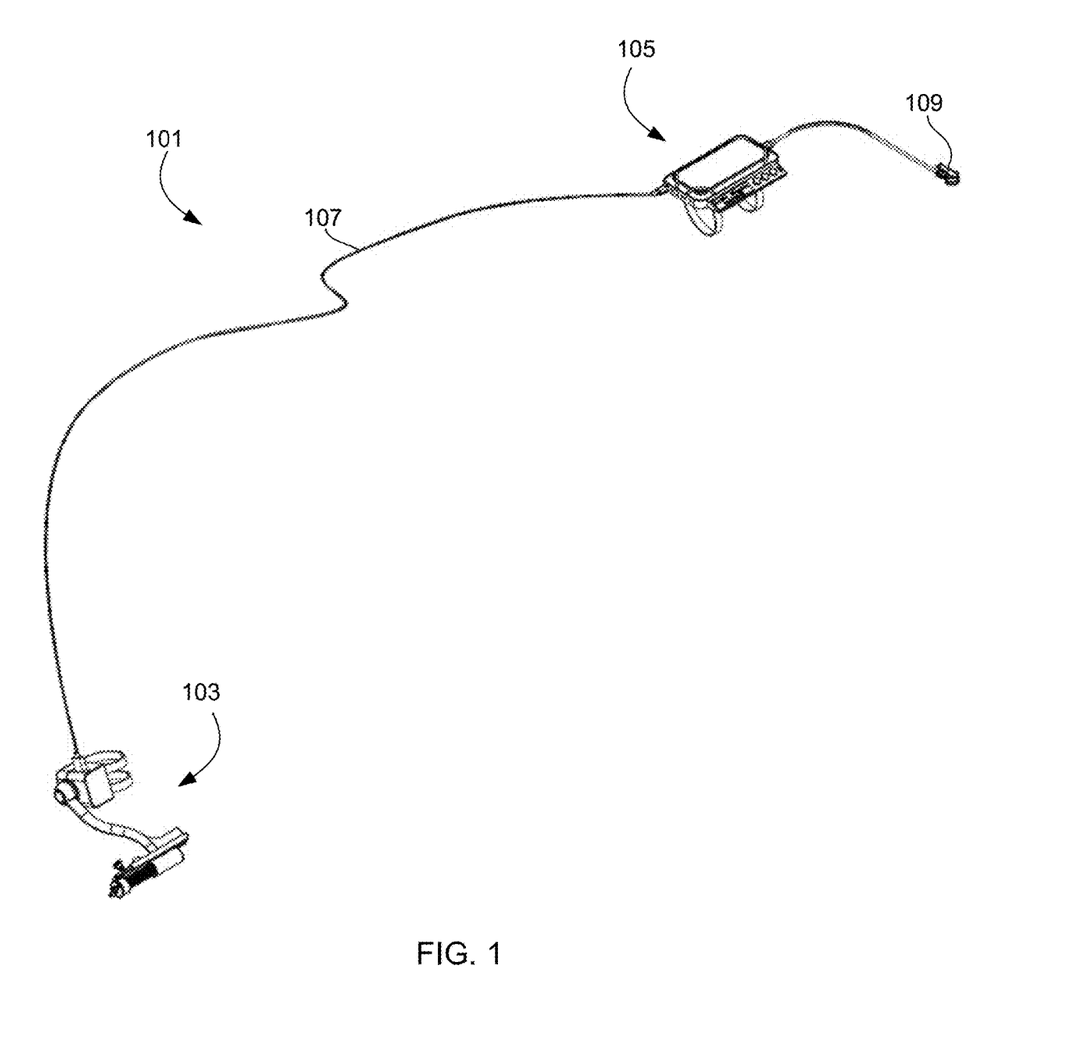
FIG. 1 is a perspective view of a portable direct shaft power generation and monitoring system according to an embodiment of the present application.

Referring now to FIG. 1 in the drawings, a perspective view of a portable direct shaft power generation and monitoring system 101 is illustrated. System 101 is configured to be detachable from a wheeled occupant apparatus 99 (see FIG. 2) so as to operate with various different types of wheeled occupant apparatuses. In general, system 101 is configured to generate electrical energy via a power generation unit 103 through contacting a wheel 97 (see FIG. 2) of apparatus 99. This energy may be stored and/or used to power a monitoring unit 105, other electronic devices, and so forth. Unit 103 and unit 105 are in communication via wire 107. The wire 107 is detachable from either unit 103/105. An external sensor 109 is also in communication with unit 105 for the reception of electronic data.

Figure 2:
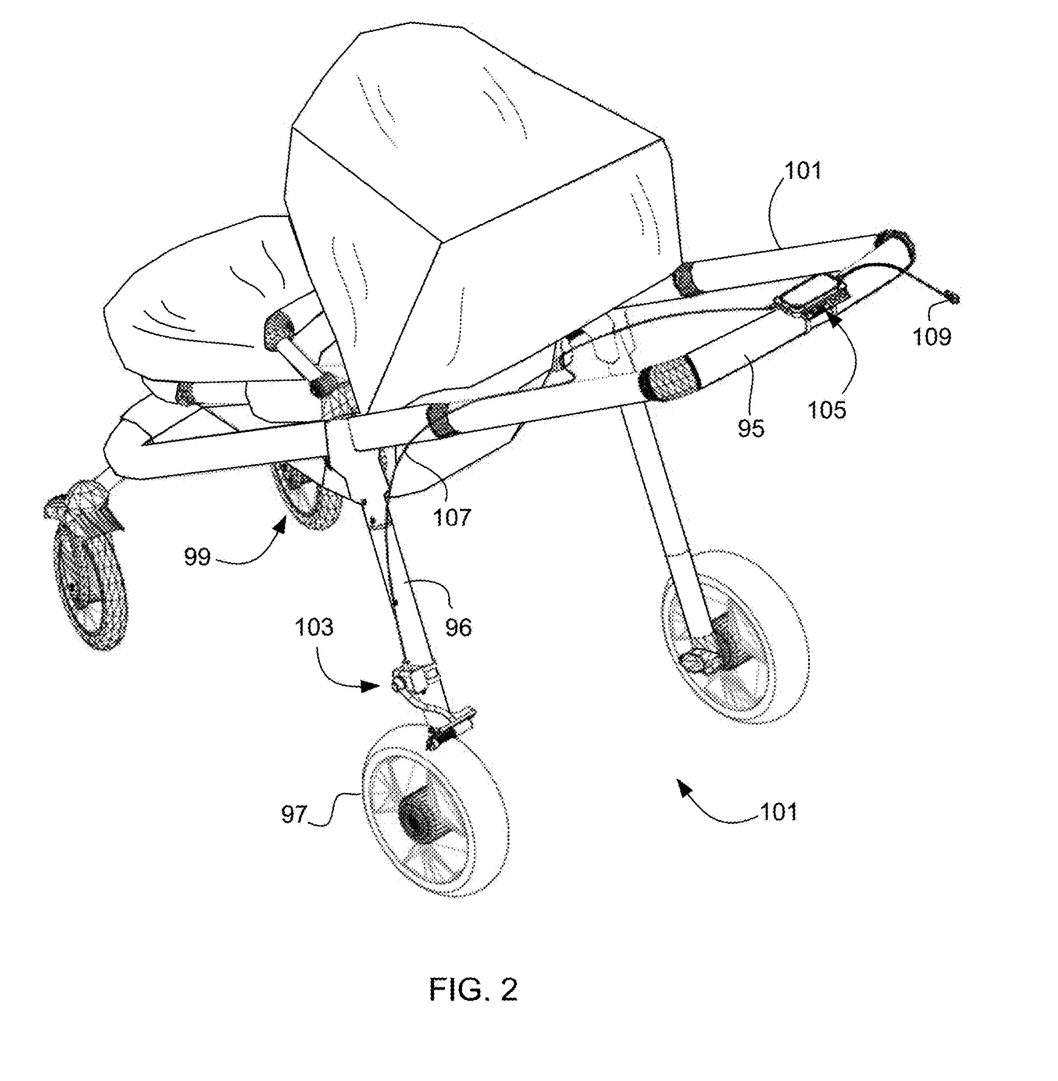
FIG. 2 is a second perspective view of the system of FIG. 1 on a wheeled occupant apparatus.

Referring now also to FIG. 2 in the drawings, a perspective view of system 101 on wheeled occupant apparatus 99 is illustrated. Unit 103 is releasably coupled to a leg 96 of apparatus 99 adjacent wheel 97. In this position, unit 103 is contacting wheel 97. Wire 107 extends therefrom and couples to unit 105. Unit 105 is releasably coupled to a handlebar 95 of apparatus 99. At this location a user is able to quickly see any user data displayed via unit 105. The sensor 109 is extending from unit 105.

Figure 3:
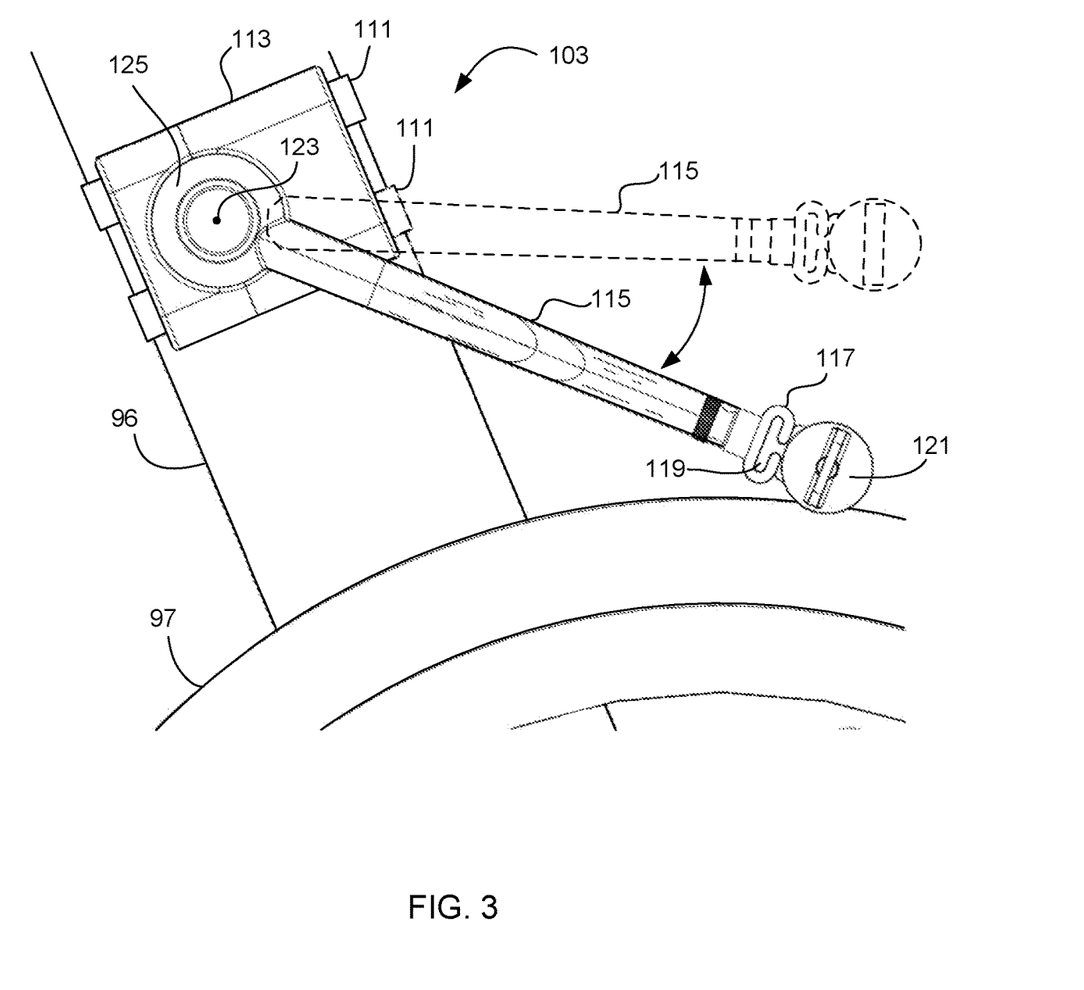
FIG. 3 is an enlarged side view of a power generation unit is the system of FIG. 2.

Referring now also to FIG. 3 in the drawings, an enlarged side view of unit 103 is illustrated. Unit 103 includes an attachment device 111 configured to releasably couple unit 103 to apparatus 99. In this embodiment, device 111 may be one or more straps that wrap around a portion of leg 96. Device 111 is in communication with a housing 113 used to conceal and protect the internal components of unit 103. A pivoting arm 115 extends from housing 113 and is used to hold the rotating gear in selective contact with wheel 97.

Figure 4:
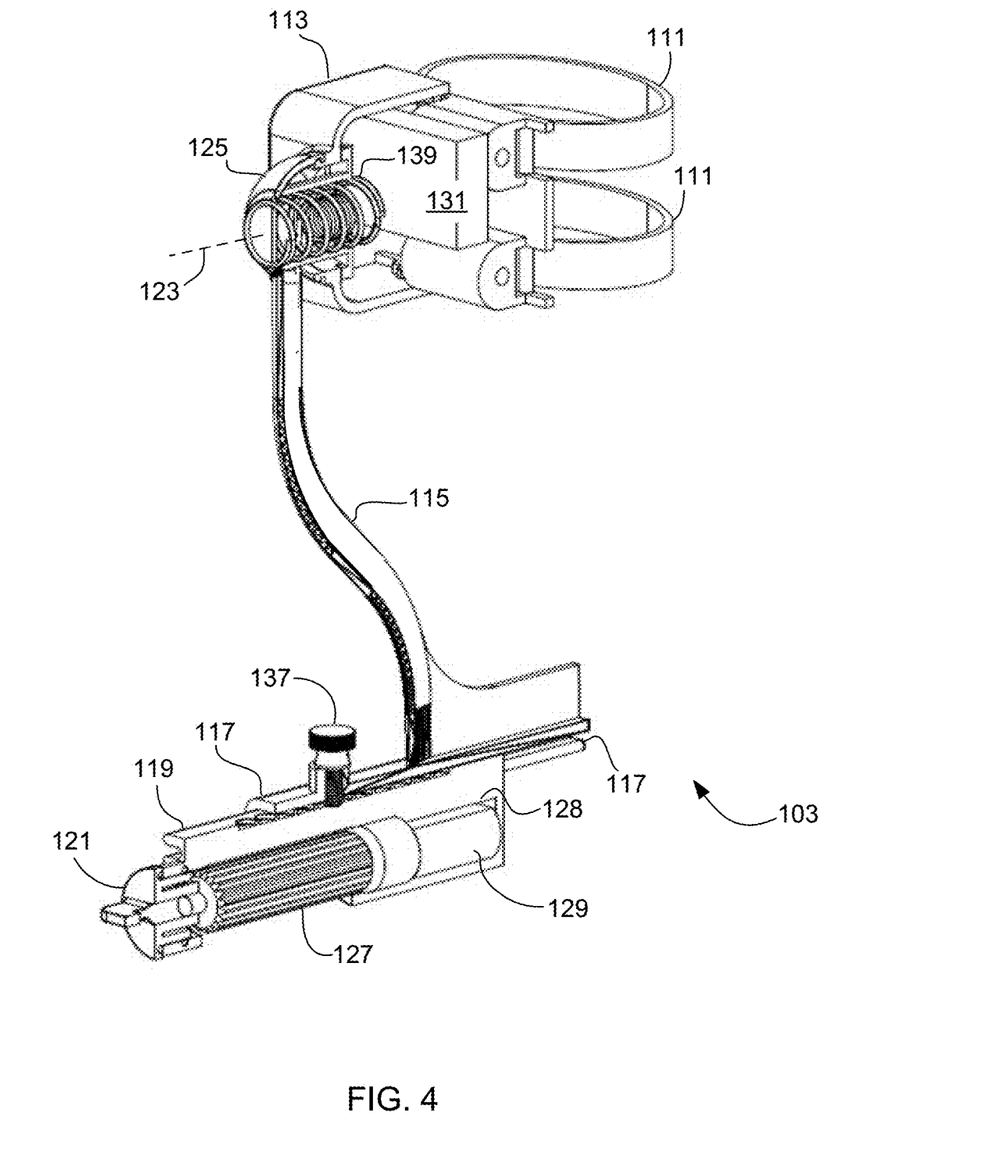
FIG. 4 is a section view of the power generation unit of FIG. 3.

Pivoting arm 115 includes a track 117 and a slide member 119 along its distal end. Track 117 is a linear sleeve in the shape of a c-channel wherein slide member 119 is configured to have a similar shape so as to translate side to side within track 117. A more clear view of track 117 and slide member 119 is shown in FIG. 4 below. A cap 121 is shown at an outer end of slide member 119.

Pivoting arm 115 is configured to rotate about an axis 123 such that pivoting arm 115 operates between an elevated position and an operational position. In the elevated position, pivoting arm 115 avoids contact with wheel 97. Pivoting arm 115 is lockable into this position at any time when a user is not needing or desiring for the generation of electrical energy. In the operational position, pivoting arm 115 is rotated such that it contacts wheel 97.

Figure 5:
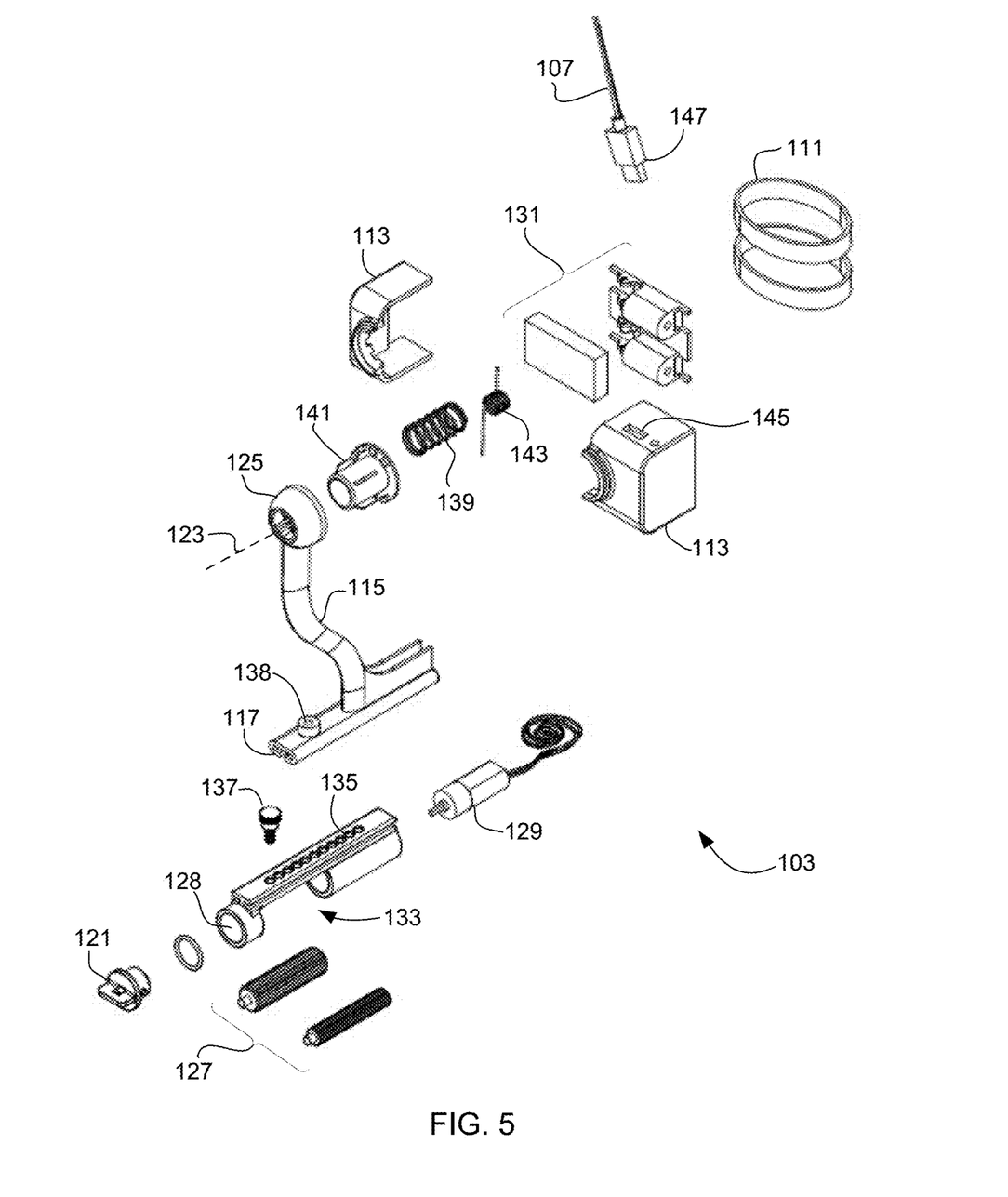
FIG. 5 is an exploded view of the power generation unit of FIG. 3.

Referring now also to FIGS. 4 and 5 in the drawings, a partial section view of unit 103 is illustrated so as to view the internal components therein, as well as an exploded view of unit 103. As noted previously, at the distal end of pivoting arm 115 is track 117 and slide member 119. Slide member 119 includes a rotating gear 127 that is configured to slide into and out of a hollowed internal sleeve 128. At the base of the hollowed internal sleeve 128 is motor 129. As rotating gear 127 rotates about its axis from contact with wheel 97, motor 129 is configured to spin up and generate an electrical energy or current.

Motor 129 is wired to control unit 131 such that energy generated may be passed to control unit 131 for storage and/or transmission to unit 103. Unit 131 is configured to regulate the transmission and storage of electrical energy from motor 129 and gear 127. As seen in FIG. 4, cap 121 is configured to releasably couple to the end of slide member 119 at the entrance of sleeve 128. Cap 121 retains gear 127 in place. Also as seen in FIG. 5, slide member 119 includes a slot 133 within sleeve 128 so as to expose a portion of gear 127. Wheel 97 is to selectively pass through slot 133 and engage gear 127 directly when in the operational position.

Also with respect to FIG. 5, slide member 119 can be seen having a plurality of apertures 135 along an upper surface. Unit 103 is configured to permit for the selective locating of gear 127 relative to wheel 97. As wheels of apparatuses 99 can be in different locations or distances from legs 96, such adjustment is necessary to ensure proper alignment with wheel 97. A pin 137 is included and configured to pass through a hole 138 in track 117 or arm 115. The pin 137 may be partially threaded. Pin 137 extends therethrough into one of apertures 135 to retain the horizontal linear position of slide member 119.

It is important to note that gear 127 may be of various sizes depending on any number of factors. Gear 127 may be interchanged and/or replaced with one of a secondary gear as seen in FIG. 5. The different gears may have a different diameter so as to interchange gear ratios.

Referring back up to a proximal end of pivoting arm 115, a hub 125 is formed and used to rotatingly couple pivoting arm 115 to housing 113. Within hub 125 is a first spring 139 configured to regulate the position of hub 125 and arm 115 relative to a locking mechanism 141. Spring 139 is configured to maintain a separation force between hub 125 and mechanism 141, such that arm 115 may rotate freely when not locked. To engage locking mechanism 141, a user may lift or rotate arm 115 from an operational position to an elevated position, using electrical and/or mechanical means. Mechanism 141 is configured to automatically engage and secure arm 115 in the elevated position. To release, a user depresses hub 125 inward along axis 123 which thereby compresses spring 139 and allows for the free rotation of arm 115 to an operational position.

A second spring 143 is configured to apply a rotational force about arm 115 such that a moment is continuously applied thereto so as to keep a normal force applied between gear 127 and wheel 97. This prevents arm 115 from being loose and rotating away from wheel 97 during use. Spring 143 is located adjacent to spring 139 within housing 113.

Wire 107 is coupled to control unit 131 via a port 145 in housing 113. Wire 107 has an optional adapter 147 to permit releasable communication. Other embodiment may yield a hard wired connection between wire 107 and unit 131.

It is understood that the manual lifting of arm 115 between positions is only one method of enacting the function of engaging and disengaging the gear 127 with wheel 97. In its most root form of function, arm 115 is configured to create a movement of gear 127 such that gear 127 can alternate positions to selectively engage wheel 97. Arm 115 may be internal to a housing or external as shown. The length of arm 115 is not herein limited to that shown. Any mechanical or electrical means are possible, whether automatic or manually operated.

Figure 6:
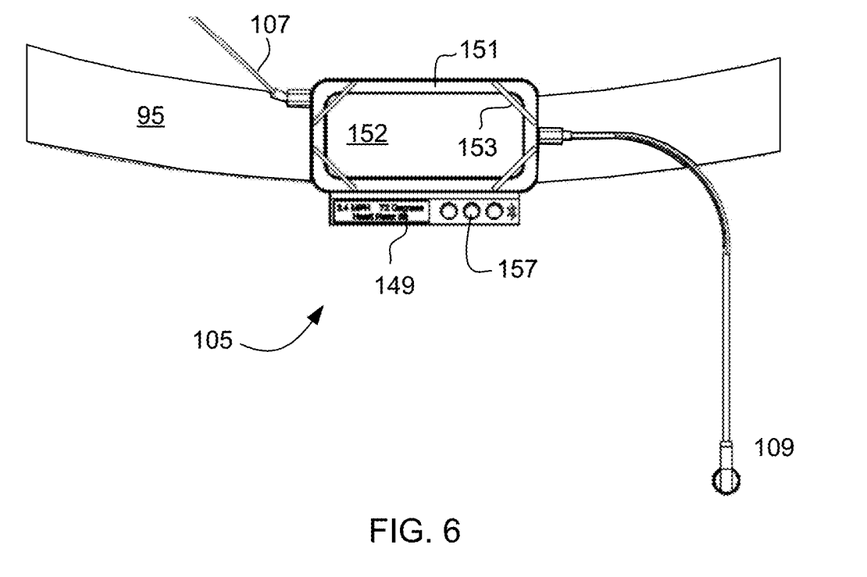
FIG. 6 is an enlarged top view of a monitoring unit of FIG. 2.

Referring now also to FIG. 6 in the drawings, a top view of monitoring unit 105 is illustrated. Monitoring unit 105 is in electrical communication with unit 103 via wire 107 and is configured to selectively dispense or regulate electrical power. Additionally, unit 105 is configured to gather data from sensor 109 and compile such data for the display of user data to a user. It is understood that wire 107 may be detachable from unit 105 similarly to that seen with unit 103.

Figure 7:
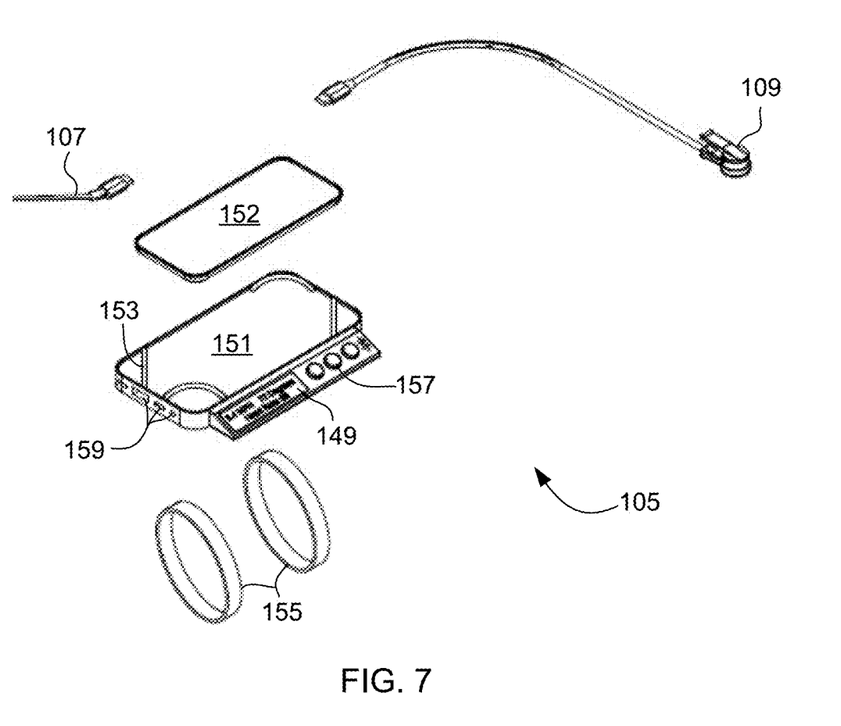
FIG. 7 is a partially exploded view of the monitoring unit of FIG. 6.

Referring now also to FIG. 7 in the drawings, a partial exploded perspective view of unit 105 is illustrated. Monitoring unit 105 includes an optional display 149 to show user data to the user. The data may be depicted in various visual forms. Additional audio notifications may be provided as well through one or more speakers. Any of visual or audio means are notifications that may be provided to the user. Unit 105 may also include a charging surface 151 for selective charging of a remote electronic device 152, such as a phone. One or more attachment members 153 may be used (i.e. straps) to retain the electronic device 152 in contact with charging surface 151.

It is understood that attachment devices 155 are used to secure unit 105 to handlebar 95. These are similar in form and function to devices 111. A user interface 157 may also be used to control the information displayed via display 149 and the operation of control unit 131 in unit 103. Additionally, interface 157 may regulate the operation of sensor 109. It should be understood that display 149 and interface 157 are optional on unit 105 in that in a most basic manner, unit 105 may include only a simple charging function. Batteries or power may be stored in either unit 103 and/or 105.

Unit 105 includes one or more ports 159 for the selective engagement of wires, such as wire 107. It is understood that a wire may be routed between ports 159 and device 152 wherein device 152 may act as the display and provide operational control of system 101. If used as such, display 149 and interface 157 may be unnecessary. User data would be processed through device 152 in real time.

External sensor 109 is configured to compile and gather data for transmission to unit 105. The data may be related to at least one of occupant vitals (i.e. blood pressure, heart rate, body temperature, and so forth) and environmental conditions (i.e. outside temperature, humidity, speed of travel). Additionally, sensor 109 may be used to provide performance data of system 101, such as charge status, charge rate, speed of travel, load capacity, and so forth. Sensor 109 may be interchanged with one or more sensors to facilitate individual or collective gathering of the data. Such data is processed within unit 105. Unit 105 may also monitor battery levels, charge data, and any other performance data of units 103 and 105.

Figure 8:
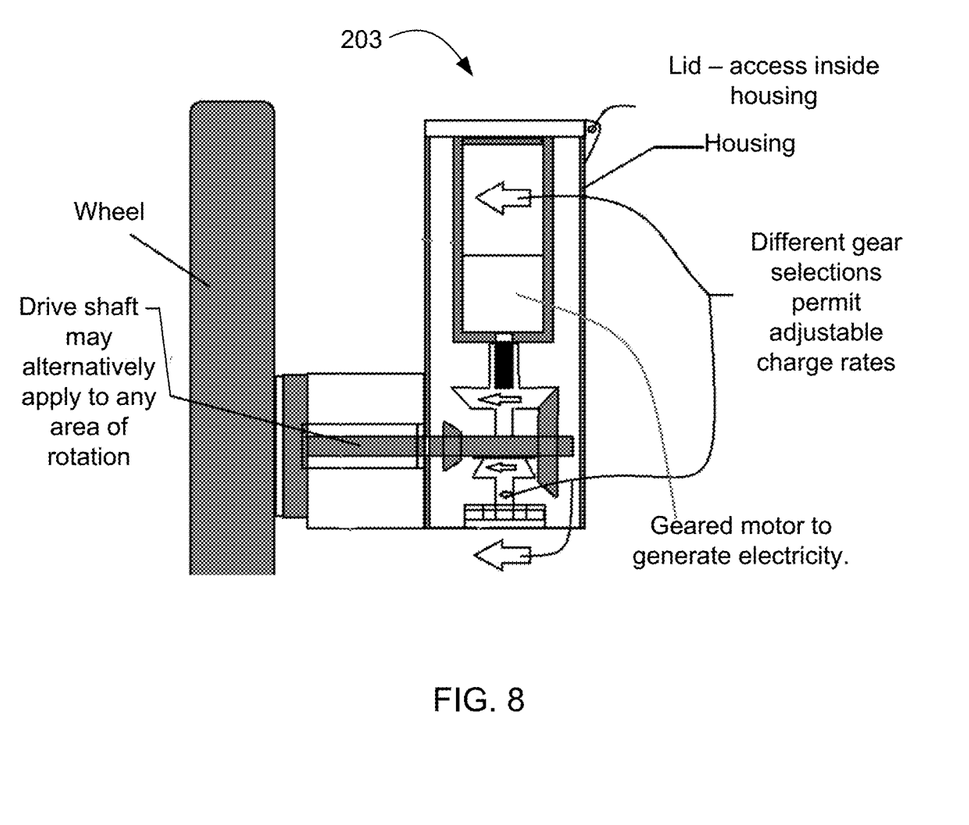
FIG. 8 is an internal exemplary alternate embodiment of the power generation unit of FIGS. 3-5.

Referring now also to FIG. 8 in the drawings, an internal exemplary view of an alternate embodiment of the power generation unit 103 is illustrated. Unit 203 is similar in form and function to power generation unit 103. Unit 203 may use planetary gears that rotate as a result of contact with the wheels or shaft of the wheeled occupant apparatus. It may be connected to the drive shaft or the wheel or any other rotating or translating portion. The geared motor moves and in doing so generates an electric charge. This charge may be stored for later use as a power supply or may be instantly transferred for use by an electronic device. A lid is used to provide access internally to the motor. A feature of unit 203 is that the motor is geared such that it can change gear ratios to adjust the charge rate of the motor. Additionally, the polarity of the motor may be switched to permit charging in both forward and rear movements of the occupant apparatus, such is also the case with the embodiments of FIGS. 1-7.

The geared-motor communicates rotation from an apparatus directly to a motor output shaft thereby providing more torque by way of the motor's planetary functions and is a quieter power generating device. A geared-motor also provides the ability to shift gears depending on how fast the device is traveling and the amount of power desired by the operator. More benefits to using a geared motor instead of a three-part system is application. With a geared-motor being as small as a battery, the motor output shaft can be inserted into a channel within the wheel or directly into the shaft. It can use friction contact or relay rotation from anywhere there is rotation. It may be positioned on any access as long as geared motor-shaft captures rotation on the wheeled occupant apparatus. Further still, a geared-motor may be easily accessed and replaced, something that's not easy with current three part systems. Conventional systems present a huge waste of space. The geared motor of unit 203 may be utilized for quieter and more functional designs. There need not be any median reduction system between the geared-motor and the devices means of rotational contact before the motor output shaft.

The current application has many advantages over the prior art. The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A power generation system for a wheeled occupant apparatus, comprising:
   a power generation unit detachable from the wheeled occupant apparatus, the power generation unit including:
   an arm;
   a rotating gear attached to a first end of the arm and in communication with a wheel of the wheeled occupant apparatus and configured to rotate upon movement of the wheeled occupant apparatus such that rotation of the rotating gear induces an electrical power generation effect in a motor;
   wherein the arm is configured to include a spring at a second end of the arm to rotate the arm onto the wheel of the wheeled occupant apparatus so as to apply a normal force between the rotating gear and the wheel of the wheeled occupant apparatus;
   wherein the arm is lockable at the second end into an elevated position such that the rotating gear avoids contact with the wheel of the wheeled occupant apparatus;
   wherein the arm includes a slide member at the first end of the arm and configured to translate within a track, the slide member position being adjustable within the track, and the rotating gear being attached to the slide member;
   the track includes a removable pin to pass through the track and into the slide member for securely locking the slide member; and
   a control unit in communication with the motor through the rotating gear, the control unit configured to regulate the storage and transmission of electrical power; and
   a monitoring unit in electrical communication with the power generation unit, the monitoring unit configured to dispense electrical power.

2. The system of claim 1, wherein the power generation unit includes an attachment device configured to releasably couple the power generation unit to the wheeled occupant apparatus.

3. The system of claim 1, wherein the arm is configured to selectively rotate about an axis.

4. The system of claim 1, wherein the rotating gear is removable.

5. The system of claim 4, wherein the rotating gear is interchangeable with a secondary rotating gear.

6. The system of claim 1, wherein the monitoring unit is coupled to the control unit via a wire, electrical power is configured to pass from the power generation unit to the monitoring unit through the wire.

7. The system of claim 6, wherein the wire is detachable.

8. The system of claim 1, wherein the monitoring unit includes a display for broadcasting a notification to a user.

9. The system of claim 1, wherein the monitoring unit includes a charging surface.

10. The system of claim 1, wherein the monitoring unit includes an external port.

11. The system of claim 10, wherein the external port is configured to transmit user data to an external electronic device.

12. The system of claim 11, wherein a user is able to receive the user data in real time through the external electronic device.

13. The system of claim 1, wherein the monitoring unit includes an external sensor.

14. The system of claim 13, wherein the external sensor monitors occupant vitals.

15. The system of claim 13, wherein the external sensor monitors environmental conditions.

\* \* \* \* \*